R. B. RENNER.
TRAY ELEVATOR.
APPLICATION FILED AUG. 28, 1912.

1,086,399.

Patented Feb. 10, 1914.
2 SHEETS—SHEET 1.

Witnesses
Jos. V. Collins
Stanley W. Cook

Inventor
Roland B. Renner

By H. H. Bliss

Attorney

R. B. RENNER.
TRAY ELEVATOR.
APPLICATION FILED AUG. 28, 1912.
1,086,399.
Patented Feb. 10, 1914.
2 SHEETS—SHEET 2.
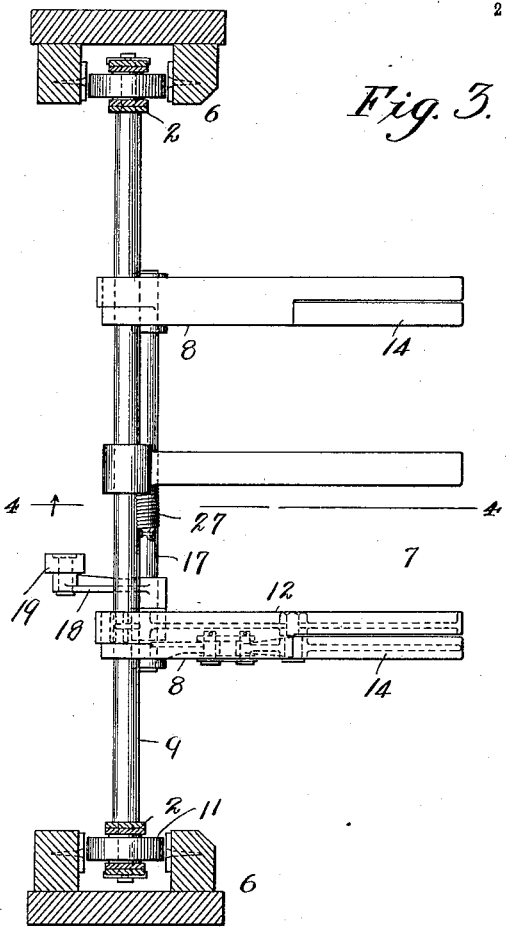
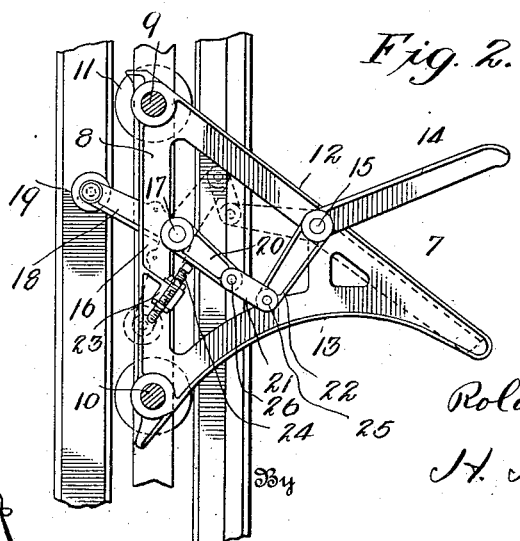
Inventor
Roland B. Renner
H. H. Bliss
By
Attorney
Witnesses

UNITED STATES PATENT OFFICE.

ROLAND B. RENNER, OF COLUMBUS, OHIO, ASSIGNOR TO THE JEFFREY MANUFACTURING COMPANY, OF COLUMBUS, OHIO, A CORPORATION OF OHIO.

TRAY-ELEVATOR.

1,086,399.   Specification of Letters Patent.   Patented Feb. 10, 1914.

Application filed August 28, 1912. Serial No. 717,494.

*To all whom it may concern:*

Be it known that I, ROLAND B. RENNER, a citizen of the United States, residing at Columbus, in the county of Franklin and State of Ohio, have invented certain new and useful Improvements in Tray-Elevators, of which the following is a specification, reference being had therein to the accompanying drawing.

This invention relates to improvements in tray conveyers and more particularly to conveyers of the type in which each has a series of article-carrying trays secured to an endless chain and so arranged as to automatically discharge at any predetermined point.

The object of the invention is to provide in a conveyer of the type referred to, an improved tray or carrier construction and an improved means for effecting the discharging of the loads from the trays as desired.

Figure 1:
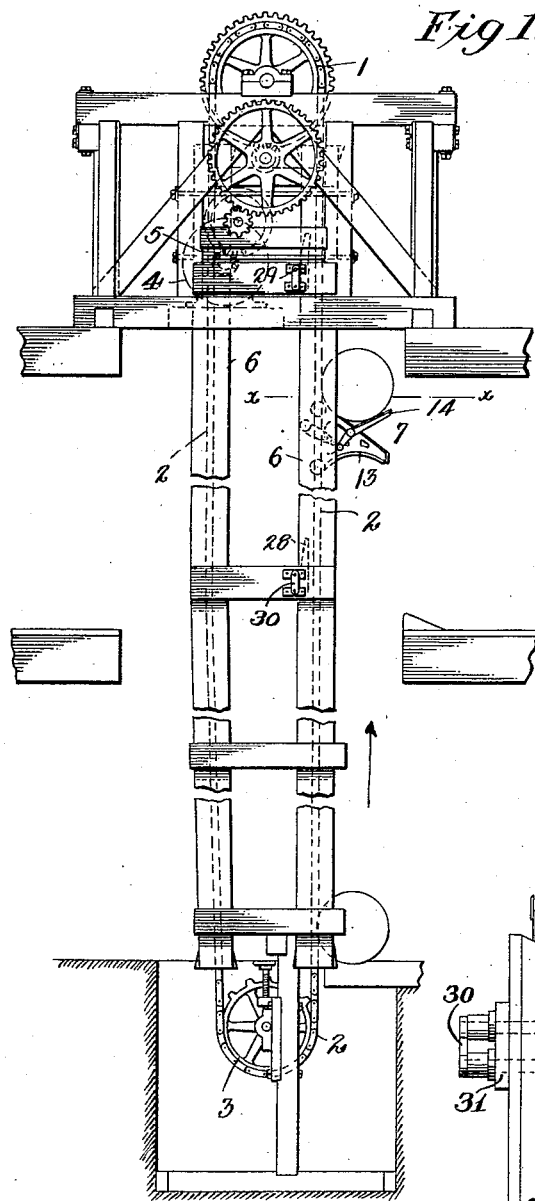
Figure 4:
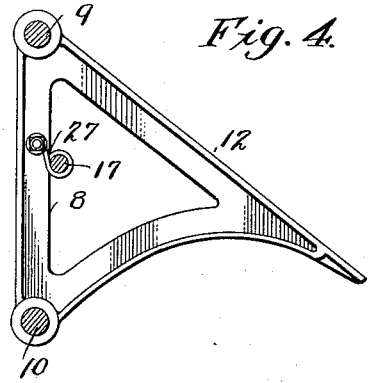
Figure 5:
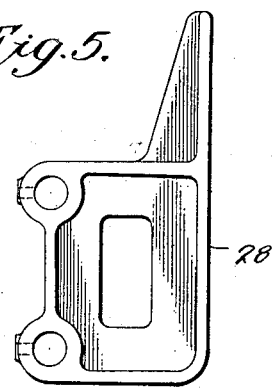
Figure 6:
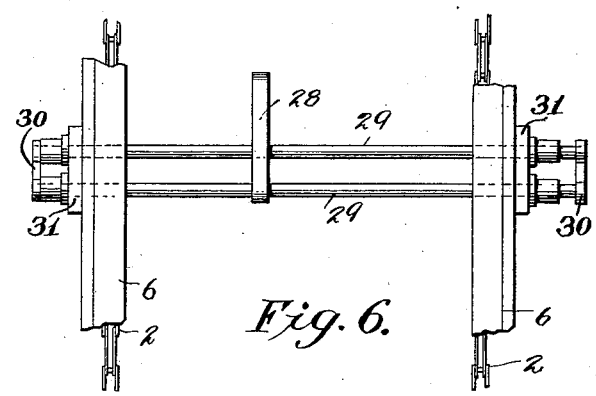

In the drawings Figure 1 is a side elevation of the conveyer system. Fig. 2 is an enlarged side elevation of one of the conveyer trays. Fig. 3 is a horizontal view on the line $x$—$x$ of Fig. 1. Fig. 4 is a vertical section on the line 4—4 of Fig. 3. Fig. 5 is a detail view of the operating trip cam. Fig. 6 is a detail view showing the cam mounting.

In the drawings, the numeral 1 indicates the head sprocket wheels of an endless tray elevator. Endless chains 2, 2 travel over the head sprocket wheels 1 and over the foot sprocket wheels 3. The wheels 1 are power driven in any suitable manner, as, for instance, by an electric motor 4 through a train of gearing 5. The lower sprocket wheels are vertically adjustable so as to take up slack in the chains as wear takes place and are located below the lowest point at which articles are to be loaded or unloaded. The chains operate in the vertical guideways 6, 6, and carry at intervals the article-carrying trays indicated in general by the numeral 7.

Each carrying tray comprises a series of vertically arranged castings 8 approximately triangular in outline secured to the endless chains by means of the upper and lower cross bars 9 and 10. Rollers 11 are carried at the ends of these bars and serve to guide the chains within the vertical tracks 6, 6. Although, any number of the carrier castings may be placed upon the transverse rods depending upon the character of the articles to be carried and transferred from floor to floor, I have in the present showing of my invention illustrated but three, this number being sufficient for handling barrels, boxes, and such articles.

The trays are so arranged that when they are traveling upward the inclined surfaces 12 will be uppermost. The opposite surfaces of the castings are concaved as at 13 so that the trays may be used to carry barrels or other articles on the descent.

Pivoted to the two outer tray castings or fingers 8 are the movable fingers 14. The fingers 14 are pivoted upon the pins 15 positioned approximately half way down the inclined surface 12. In the vertical legs 16 of the castings 8 is journaled a transverse shaft 17 having secured thereto an inward extending lever 18 provided at its end with a roller 19. On the shaft 17 opposite each of the fingers 14 is located an inward extending arm 20 connected by means of strap links 21 to the inward extending ends 22 of the fingers 14. A lug 23 extends outward from the vertical leg 16 of one of the castings 8 and is provided with an opening adapted to receive an adjustable bolt 24 so positioned that its head will come into contact with one of the arms 20 when it is at its lowest position. This stop being adjustable permits of the arm 20 being swung downward to such a position that a straight line drawn through the center of the shaft 17 and the pin 25 connecting the finger 14 and the strap links 21 will pass above the center of the pin 26 which connects the strap links with the arm 20. This system of levers forms a toggle connection between the operating lever 18 and the pivoted fingers 14. When swung downward into the position shown in Fig. 2, pressure upon the ends of the fingers 14 serve only to lock the toggle and prevent the fingers 14 from movement. In this position the inclined surfaces 12 of the fingers 8 form with the pivoted fingers 14 an article-receiving tray. When, however, the lever 18 is moved downward throwing upward the connection between the arms and the toggle links 21, the fingers 14 will, subjected as they are to the pressure of the weight which they are carrying, instantly fly downward assuming the position indicated by dotted lines in Fig. 2. The article is allowed to roll or slide down the incline 12 and out upon skids or other receiving apparatus located upon the floor to which the goods are to be delivered. A coil spring 27 surrounds the transverse shaft 17 being secured at one end to one of the tray castings 8 and at the other end to the transverse shaft. The tension on the spring is such that it will normally throw the toggle connection into its locking position so that the instant the lever 18 is released and the goods delivered, the fingers 14 will immediately fly upward into the locked carrying position.

In order to operate the lever 18 to discharge articles carried by the tray, a cam 28 is positioned opposite each of the delivery points. Each cam is so arranged that its lower side contacts with the rollers 19 when in the unloading position. Each cam is carried by two transverse rods 29, 29. The ends of the rods 29, 29 pass through the bearings 31 secured to the chain guides. These rods are somewhat greater in length than the actual distance between the outer sides of the bearings and are therefore free to move out and in a short distance carrying the unloading cam 28 out of or into the loading position. The ends of the two rods are secured to handles 30.

The carrying trays are so arranged that on releasing the fingers 14 they are free to drop down into the plane of the inclined fingers 8. The entire weight of the article then being discharged is carried by the rigid downward inclined fingers and no strain whatever is thrown upon the pivoting shafts or operating devices. The transverse finger operating shaft 17 is located well to the rear of the tray so as to leave unobstructed the space between the fingers. This is of material advantage in that an ordinary type of intermeshing finger discharge platform may be used on the downward traveling of a flight conveyer.

What I claim is:—

1. In a tray conveyer, the combination of the endless carrier, the tray fingers extending outward from the carrier and inclined away from the direction of travel, the movable fingers pivoted to the inclined fingers, means for normally holding the second mentioned fingers in a position to form with the inclined fingers a carrying tray, and means for releasing the said holding means.

2. In a tray elevator, the combination of the endless carrier, the frame attached to the carrier and inclined away from the direction of travel, the movable fingers pivoted to the inclined frame, means for normally holding the movable fingers in the position to form with the inclined frame an article carrying tray, and means for releasing the said holding means.

3. In a tray conveyer, the combination with the endless carrier, of the fingers extending outward from the carrier and inclined rearward from the direction of travel, the movable fingers pivoted to the said inclined fingers and adapted when in a normal position to form with the inclined fingers an article supporting tray, the transverse shaft, the lever carried by the shaft, the arms carried by the shaft, and the links connecting the ends of the said arms and the inner ends of the said pivoted fingers.

4. In a tray elevator, the combination of the endless carrier, the tray frame connected to the carrier and having an outward and downward inclined surface, the supporting fingers pivoted to the said frame and adapted when in their normal position to form with the frame an article supporting tray, the toggle connection between the inner ends of the said fingers and the frame whereby the fingers are normally held in their carrying position, and means for operating the said toggle allowing the movable fingers to drop down into the plane of the inclined surface.

5. In a tray conveyer, the combination of the endless carrier, the tray frame connected with the carrier and having a downwardly inclined surface, the movable fingers pivoted to the said frame and adapted to be normally held in a position to form with the inclined surface an article-supporting tray, the transverse shaft journaled in the frame, the lever connected to the said shaft, the arms carried by the shaft, the links connecting the ends of the arms with the inner ends of the said fingers, and the cam adapted to be engaged by the lever, substantially as and for the purpose set forth.

6. In a tray conveyer, the combination of the endless carrier, the tray frame connected with the carrier and having a downwardly inclined surface, the movable fingers pivoted to the said frame and adapted normally to form with the inclined surface of the frame an article-carrying tray, the transverse shaft journaled in the frame, the lever connected to the shaft, the arms carried by the shaft, the links connecting the ends of the said arms with the inward extending ends of the movable fingers, the resilient means for normally holding the said arms and links at a point where they will lock the pivoted fingers in the carrying position, and means for operating the said lever to release the pivoted fingers.

7. In a tray conveyer, the combination with the endless carrier, of the tray frame attached to the carrier and having a downward inclined surface, the movable fingers pivoted to the frame and adapted normally to form with the inclined surface an article-carrying tray, the transverse shaft journaled in the frame, the lever connected to the shaft, the arms carried by the shaft, the link connections between the arms and the inner ends of the fingers, the resilient means for normally holding the said arms and links at a point where the said links form a toggle connection locking the movable fingers in the carrying position, the means for operating the lever to release the locking connection with the pivoted fingers, and adjustable means for limiting the downward movement of the inner ends of the said arms.

8. In a tray conveyer, the combination of the endless carrier, the tray frame connected with the carrier, the pivoted tray fingers, the lever pivoted to the frame, the link connections between the fingers and the lever, the resilient means for normally holding the lever and links at a point where they will lock the tray fingers in a carrying position, and adjustable means for varying the said locking position.

9. In a tray elevator, the combination of the endless carrier, the fingers secured to the endless carrier extending outward therefrom and inclined rearward from the direction of travel, the movable fingers pivoted to the said inclined fingers intermediate their ends and adapted when in normal position to form with the inclined fingers an article supporting tray, means for normally holding the movable fingers in the tray forming position, and means for releasing the movable fingers and permitting them to swing downward into the plane of the inclined fingers and permit the discharge of the package.

10. In a tray elevator, the combination of the endless carrier, the tray secured thereto with its article supporting surface lying in a plane extending outward from the carrier and inclined rearward from the direction of travel, movable means secured to the said tray and extending upward from the tray to form in conjunction therewith an article supporting rack, and means for carrying said movable means to points below the surface of the tray to permit an article carried thereby to slide downward on the surface of the inclined tray.

In testimony whereof I affix my signature, in presence of two witnesses.

ROLAND B. RENNER.

Witnesses:
 CARL H. SPEER,
 DUDLEY T. FISHER.

---

Copies of this patent may be obtained for five cents each, by addressing the "Commissioner of Patents. Washington, D. C."